(12) United States Patent
Krauser et al.

(10) Patent No.: US 10,809,023 B2
(45) Date of Patent: Oct. 20, 2020

(54) FLEXIBLE TUBE CLEANING LANCE POSITIONER APPARATUS

(71) Applicant: STONEAGE, INC., Durango, CO (US)

(72) Inventors: John L. Krauser, Durango, CO (US); Jeffery R. Barnes, Ignacio, CO (US); Cody R. Montoya, Durango, CO (US)

(73) Assignee: STONEAGE, INC., Durango, CO (US)

( * ) Notice: Subject to any disclaimer, the term of this patent is extended or adjusted under 35 U.S.C. 154(b) by 380 days.

(21) Appl. No.: 15/925,552

(22) Filed: Mar. 19, 2018

(65) Prior Publication Data

US 2018/0266777 A1    Sep. 20, 2018

Related U.S. Application Data

(60) Provisional application No. 62/473,601, filed on Mar. 20, 2017, provisional application No. 62/549,796, filed on Aug. 24, 2017.

(51) Int. Cl.
*F28G 15/08* (2006.01)
*F28G 15/02* (2006.01)
(Continued)

(52) U.S. Cl.
CPC .............. *F28G 15/08* (2013.01); *B08B 3/024* (2013.01); *B08B 9/0433* (2013.01);
(Continued)

(58) Field of Classification Search
CPC ........ F16L 3/1091; F16L 3/223; B08B 3/024; B08B 9/0433; B08B 9/0323; F28G 1/163;
(Continued)

(56) References Cited

U.S. PATENT DOCUMENTS 2,710,225 A * 6/1955 Richards ............... F27D 25/008
                                                           239/752
3,934,731 A    1/1976 Muller et al.
(Continued)

OTHER PUBLICATIONS

International Search Report and Written Opinion, dated Jun. 28, 2018, from corresponding, co-owned International Patent Application No. PCT/US2018/023158.
(Continued)

*Primary Examiner* — Benjamin L Osterhout
(74) *Attorney, Agent, or Firm* — Greenberg Traurig, LLP

(57) ABSTRACT

A system and an apparatus for positioning a plurality of flexible cleaning lances includes a frame removably fastened parallel to a row of tubes in a tube sheet within a domed end of a heat exchanger. A chassis support member is mounted on the frame for movement in an X direction. A chassis having spaced apart parallel box rail members is movably mounted on the chassis support member for movement of the chassis in a Y direction. A rotary arm extends from the chassis, and a flexible lance guide hand fastened to a distal end of the rotary arm is configured to maintain a plurality of flexible lance guide tubes in parallel alignment with the row of tubes irrespective of an angle between the rotary arm and the frame. The system may include a lance drive and a snout connected between the lance drive and the positioning apparatus.

20 Claims, 8 Drawing Sheets

(51) Int. Cl.
  *F16L 3/10* (2006.01)
  *F16L 3/223* (2006.01)
  *F28G 15/04* (2006.01)
  *B08B 3/02* (2006.01)
  *B08B 9/032* (2006.01)
  *F28G 3/16* (2006.01)
  *B08B 9/043* (2006.01)

(52) U.S. Cl.
  CPC .............. *F16L 3/1091* (2013.01); *F16L 3/223* (2013.01); *F28G 3/163* (2013.01); *F28G 15/02* (2013.01); *F28G 15/04* (2013.01); *B08B 9/0323* (2013.01)

(58) Field of Classification Search
  CPC .......... F28G 3/163; F28G 15/02; F28G 15/04; F28G 15/08
  See application file for complete search history.

(56) References Cited

U.S. PATENT DOCUMENTS

| | | | |
|---|---|---|---|
| 4,095,305 A | | 6/1978 | Goodwin |
| 4,805,653 A | * | 2/1989 | Krajicek .................. F28G 1/16 134/166 C |
| 5,002,120 A | * | 3/1991 | Boisture ............ B65H 75/4402 122/391 |
| 5,018,544 A | * | 5/1991 | Boisture ................. B66C 23/54 134/111 |
| 5,022,463 A | * | 6/1991 | Boisture ............ B65H 75/4402 122/379 |
| 5,265,805 A | * | 11/1993 | Artenian ................. A47L 11/26 239/135 |
| 5,348,234 A | * | 9/1994 | v.d. Woude ............. F28G 15/02 239/753 |
| 6,626,195 B1 | | 9/2003 | Garman et al. |
| 6,681,839 B1 | | 1/2004 | Balzer |
| 7,530,363 B2 | | 5/2009 | Garman |
| 9,630,801 B2 | | 4/2017 | Barnes |
| 2004/0069331 A1 | * | 4/2004 | Garman ................. B65H 51/10 134/167 C |
| 2006/0249185 A1 | * | 11/2006 | Garman ................. B08B 9/0433 134/166 R |
| 2010/0126540 A1 | * | 5/2010 | Geppert ................. B08B 9/0433 134/166 C |
| 2013/0220389 A1 | * | 8/2013 | Snow ........................ B08B 3/02 134/166 C |
| 2014/0261547 A1 | | 9/2014 | Thomas et al. |
| 2015/0034128 A1 | | 2/2015 | Brumfield |
| 2016/0025432 A1 | * | 1/2016 | Mathis .................... F28G 15/02 248/68.1 |
| 2017/0108300 A1 | * | 4/2017 | Brumfield ............... F28G 15/02 |
| 2017/0321976 A1 | * | 11/2017 | Barnes .................... F28G 15/04 |
| 2017/0356702 A1 | * | 12/2017 | Gromes, Sr. ............ F28G 15/04 |
| 2018/0058783 A1 | * | 3/2018 | Zink ....................... F28G 15/02 |

OTHER PUBLICATIONS

TI-HD-3A Indexing System, Indexer designed for confined entry positioning, pp. 1-2, Feb. 2016, Terydon Incorporated, Ohio.†
Want Smart Indexing in Confined Entry Tube Cleaning, pp. 1-14 (screenshots), Oct. 11, 2016, https://www.youtube.com/watch?v=P3xBOPKMfCY,Internet.†

\* cited by examiner
† cited by third party

FLEXIBLE TUBE CLEANING LANCE POSITIONER APPARATUS

CROSS REFERENCE TO RELATED APPLICATIONS

This application claims the benefit of priority of U.S. Provisional Patent Applications No. 62/473,601 filed Mar. 20, 2017, entitled Flexible Tube Cleaning Lance Positioner Apparatus, and No. 62/549,796, filed Aug. 24, 2017, entitled Armor Sleeve Snout for Flexible Tube Cleaning Lance Positioner Apparatus, the contents of which are incorporated herein in their entirety.

BACKGROUND OF THE DISCLOSURE

The present disclosure is directed to high pressure fluid rotary nozzle systems. In particular, embodiments of the present disclosure are directed to an apparatus for positioning one or more flexible tube cleaning lances in registry with a heat exchanger tube sheet within a dome or other confined space.

Conventional lance positioner frames are heavy rigid frame structures that can be assembled adjacent a heat exchanger once the tube sheet flange cover, or dome, has been removed. Alternatively such frame assemblies can be bolted to the tube sheet directly. U.S. Pat. Nos. 4,095,305, 6,626,195, 6,681,839, and 7,530,363 disclose exemplary rectilinear frames adapted to be positioned adjacent or fastened to a heat exchanger tube sheet. Such assemblies are heavy, generally awkward to set up and utilize, and most require a substantial amount of space adjacent to or in line with the heat exchanger which may limit the feasibility of using such assemblies. What is needed is an apparatus for precisely positioning cleaning lances in registry with heat exchanger tubes in a tube sheet without removing the domed cover over the heat exchanger tube sheet and minimizing the number and frequency of required vessel entries.

SUMMARY OF THE DISCLOSURE

The present disclosure directly addresses such needs. One exemplary embodiment of an apparatus in accordance with the present disclosure includes a frame adapted to be removably fastened parallel to a row of tubes in a tube sheet within a domed or confined end of a heat exchanger device. A chassis is mounted on the frame. The chassis has a pair of spaced apart parallel rail members maintained in parallel relation by first and second brackets fastened to ends of the rail members. A rotary arm extends from one of the brackets and supports a flexible lance guide hand fastened to a distal end of the rotary arm. This hand is configured to maintain a plurality of flexible lance guide tubes in parallel alignment with the row of heat exchanger tubes irrespective of an angle between the rotary arm and the frame.

The frame includes a box rail member having opposite ends each fastened to a support plate removably fastened to the tube sheet. The support plate may be fastened to the tube sheet with expandable plugs that fit into the tubes in the tube sheet, or may be clamped between adjacent tubes, for example.

The apparatus incised a chassis support member mounted on the frame for movement along the box rail member of the frame in an X direction. The chassis is movably mounted on the chassis support member and is configured for movement of the chassis in a Y direction orthogonal to the box rail member of the frame. The guide hand is connected to the rotary arm by a U shaped wrist bracket. The guide hand carries at least two lance guide tubes.

A proximal end of the rotary arm has a stationary axle fixed to one of the first and second brackets and the distal end of the rotary arm has a vertical wrist axle fixed to legs of the U shaped wrist bracket. The rotary arm is journal bearing supported on the stationary axle and the wrist bracket is journal bearing supported at the distal end of the rotary arm. A cogged endless belt is connected between a cog gear fixed to the stationary axle and a wrist axle cog gear fixed to the wrist axle. This cogged endless belt ensures that no matter what the angular position of the arm is, the wrist bracket will be oriented such that the guides carried by the hand remain in exactly the same angular relationship to the frame rail, i.e. parallel to the row of tubes to which the frame rail is aligned.

Each of the first and second brackets further comprises a skid foot adjustably fastened thereto so as to rest against the tube sheet as the chassis is moved in the Y direction. This arrangement minimizes the effects of any torque applied to the support frame rail during lance operation.

An exemplary embodiment of an apparatus in accordance with the present disclosure may alternatively be viewed as having a frame including a box rail member having opposite ends adapted to be removably fastened parallel to a row of tubes in a tube sheet within a domed end or confined end space of a heat exchanging device. A chassis support member is mounted on the frame for movement along the box rail member of the frame in an X direction. A chassis having a pair of spaced apart parallel rail members maintained in parallel relation by first and second brackets fastened to ends of the parallel rail members is movably mounted preferably via multiple guide rollers on the chassis support member for movement of the chassis in a Y direction orthogonal to the box rail member of the frame.

A rotary arm extends from one of the first and second brackets in a plane parallel to the plane of the tube sheet. A flexible lance guide hand is fastened to a distal end of the rotary arm and is configured to maintain a plurality of flexible lance guide tubes in parallel alignment with the row of tubes irrespective of an angle between the rotary arm and the frame. The guide hand is connected to the rotary arm by a U shaped wrist bracket. This guide hand carries at least two lance guide tubes and may carry 3 or more lance guide tubes arranged in a line.

A proximal end of the rotary arm has a stationary axle fixed to one of the first and second brackets and the distal end of the rotary arm has a vertical wrist axle fixed to legs of the U shaped wrist bracket. The rotary arm is journal bearing supported on the stationary axle and the wrist bracket is journal bearing supported at the distal end of the rotary arm. A cogged endless belt is connected between a cog gear fixed to the stationary axle and a wrist axle cog gear fixed to the wrist axle. This endless belt is preferably tensioned by one or more adjustable idler cogs carried by the arm. The belt maintains angular alignment of the aligned lance guide tubes in the hand aligned with the X direction provided by the frame box rail and hence in the same alignment as the row of tubes in the tube sheet. Each of the first and second brackets further comprises a skid foot adjustably fastened thereto so as to rest against the tube sheet as the chassis is moved in the Y direction.

The apparatus in accordance with the present disclosure may also be viewed as including a frame including a box rail member having opposite ends adapted to be removably fastened parallel to a row of tubes in a tube sheet within a domed or confined end space of a heat exchanging device The apparatus also has a chassis support member mounted on the frame for movement along the box rail member of the frame in an X direction and a chassis having a pair of spaced apart parallel box rail members maintained in parallel relation by first and second brackets fastened between ends of the parallel rail members. The chassis is movably mounted on the chassis support member for movement of the chassis in a Y direction orthogonal to the box rail member of the frame. A gear driven rotary arm extends from one of the first and second brackets and a flexible lance guide hand is fastened to a distal end of the rotary arm. This rotary arm and hand are configured to maintain a plurality of flexible lance guide tubes in parallel alignment with the row of tubes irrespective of an angle between the rotary arm and the frame. A first air motor is mounted to the chassis support member for moving the chassis along the frame member in the X direction. A second air motor is mounted to the chassis support member for moving the chassis along the chassis support member in the Y direction. A third air motor is mounted on one of the first and second brackets for rotation of the rotary arm.

Further features, advantages and characteristics of the embodiments of this disclosure will be apparent from reading the following detailed description when taken in conjunction with the drawing figures.

DETAILED DESCRIPTION

Figure 1:
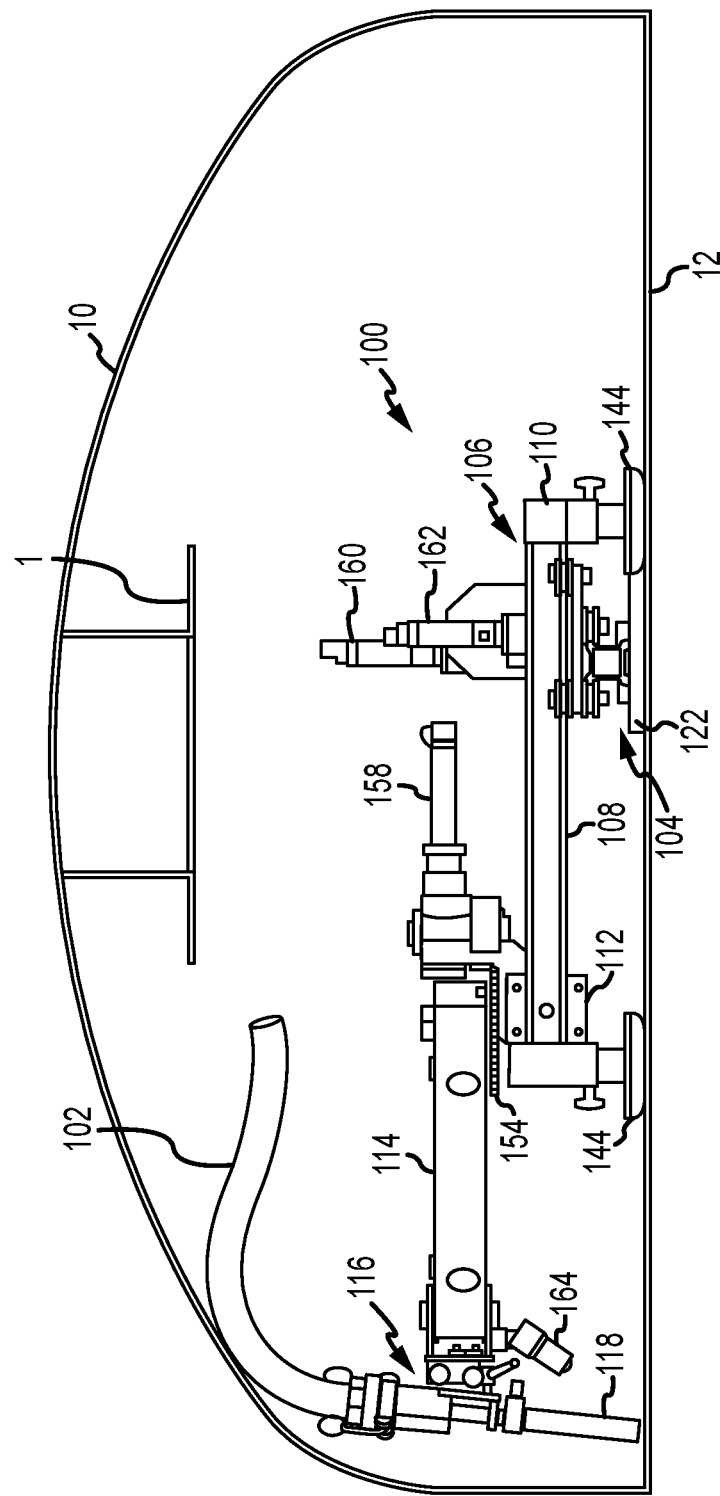
FIG. 1 is a side view of an apparatus in accordance with the present disclosure installed adjacent a heat exchanger tube sheet within a domed cover enclosure.
Figure 6:
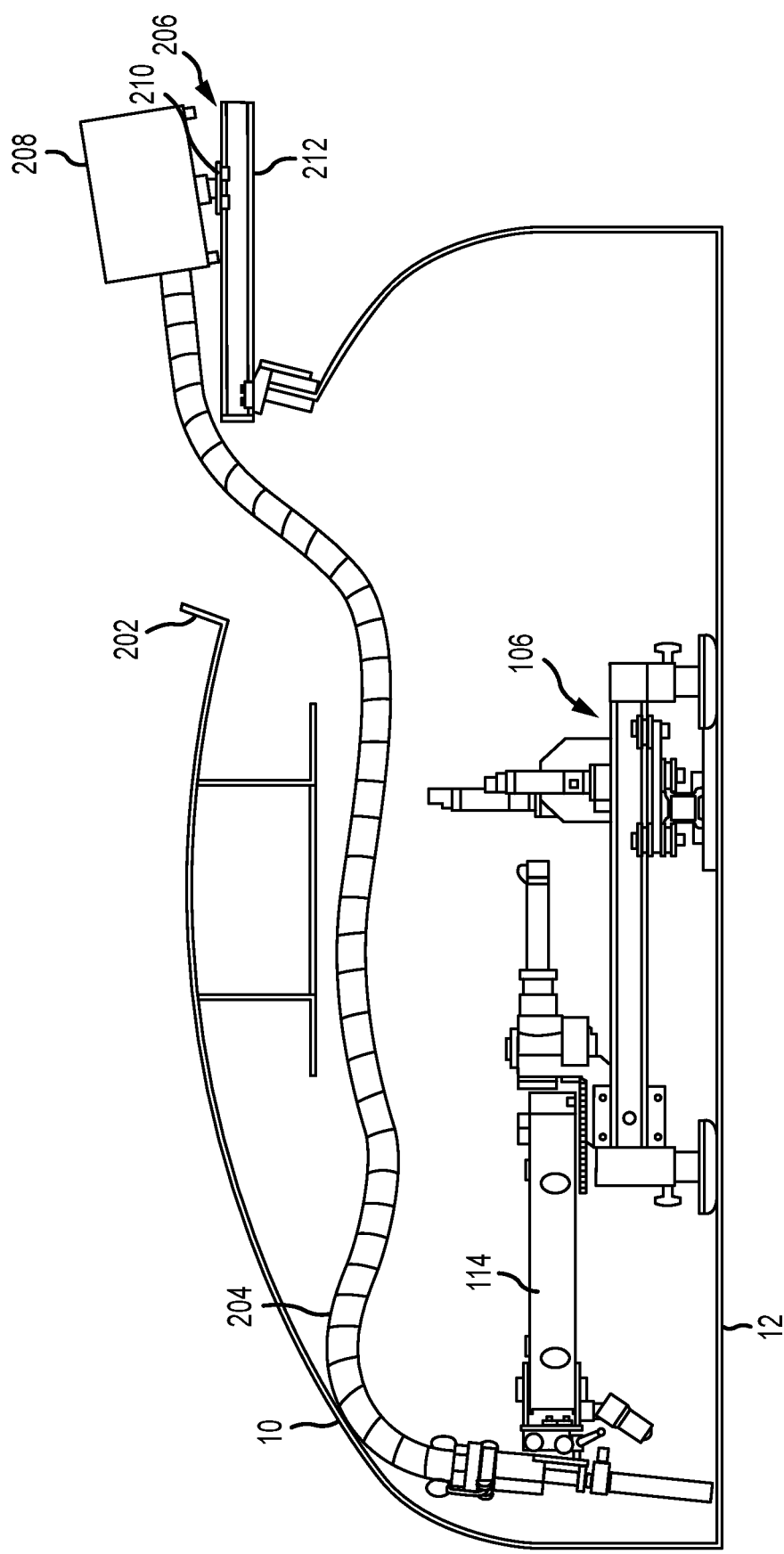
FIG. 6 is a schematic side view of a system incorporating the apparatus shown in FIGS. 1-5 in accordance with the present disclosure.

FIG. 1 shows a side view of an exemplary apparatus 100 in accordance with the present disclosure inside a dome 10 of an exemplary heat exchanger mounted on the tube sheet 12. The apparatus 100 may be inserted through a manway 202 (shown in FIG. 6) and assembled and fastened to the tube sheet 12 as shown in FIG. 1. In this embodiment of the apparatus 100, a snout 102 carries three flexible lances from a lance drive mechanism 208 mounted outside the dome 10 as shown in FIG. 6. The overall design height of the apparatus 100 is minimized to avoid interference with a flow diversion plate 18 commonly located at the top of the dome 10. This diversion plate 18 distributes product or fluid evenly across the tube sheet 12 to maximize heat transfer. These diversion plates are the lowest structure in the dome and typically are the limiting height restriction for the apparatus 100 within a dome 10.

Figure 2:
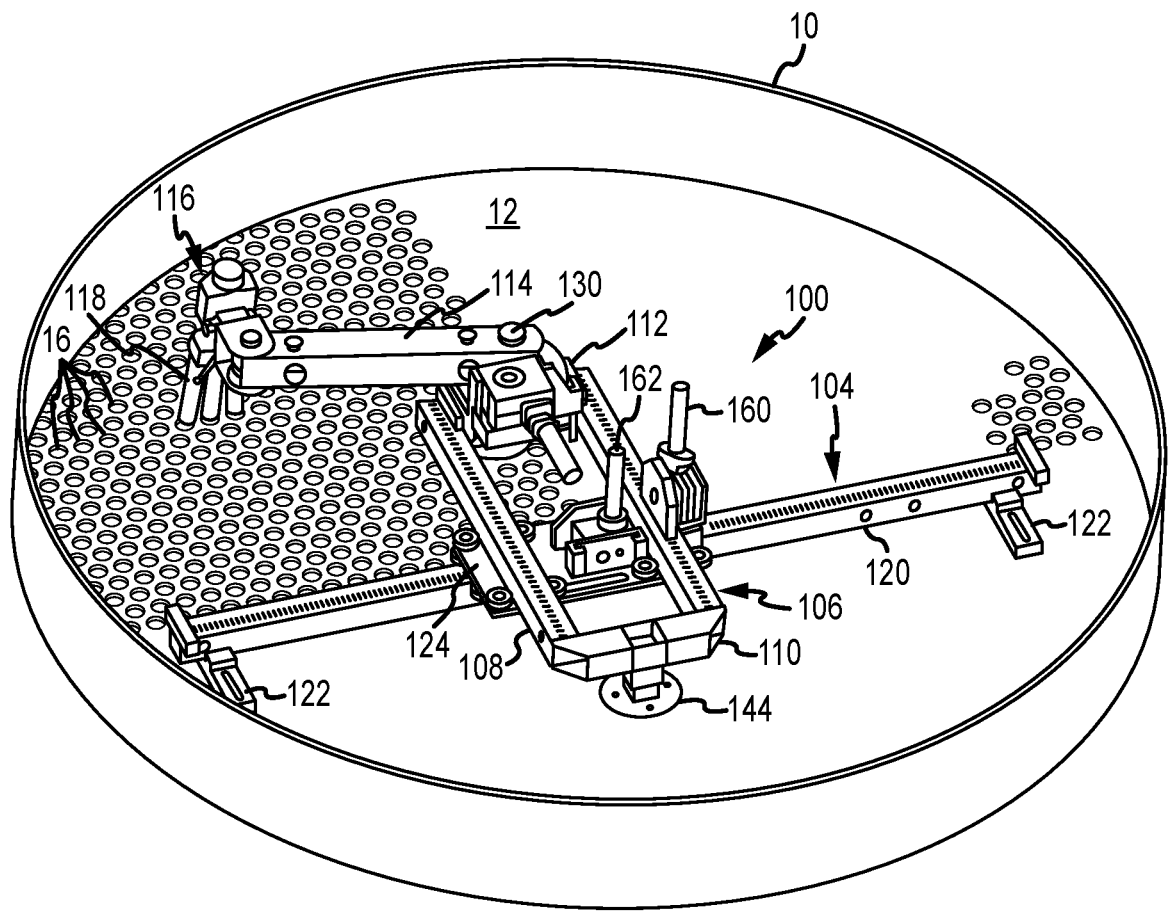
FIG. 2 is an upper perspective view of the apparatus shown in FIG. 1 with the heat exchanger cover partially broken away.

FIG. 2 is a perspective view of the apparatus 100 on the tube sheet 12 within the dome 10 with an upper portion of the dome 10 broken away, and the snout 102 removed in FIGS. 2-5 for clarity. The apparatus 100 includes a frame 104 that is removably fastened to the tube sheet 12 and is aligned, as shown, parallel to a row of tubes 16. A chassis 106 is mounted on the frame 104. The chassis 106 is a rectangular structure having a pair of spaced apart parallel rail members 108 maintained in parallel relation by a first bracket 110 and a second end bracket 112 fastened to ends of the rail members 108. A rotary arm 114 is fastened to and extends from one of the brackets 110, 112. In the embodiment illustrated, the rotary arm 114 is rotatably fastened to bracket 112 and extends away from the rail members 108, and can be rotated through an arc greater than 180°.

A flexible lance guide hand 116 is fastened to a distal end 132 of the rotatable arm 114. The hand 116 supports, carries and guides three lance guide tubes 118 and maintains the guide tubes aligned parallel to the row of tubes 16 in the tube sheet to which the frame 104 is fastened irrespective of the angle between the rotary arm 114 and the frame 104 as will be described in more detail below.

The frame 104 includes a box rail member 120 having opposite ends each fastened to a support plate 122. This support plate 122 is removably fastened to the tube sheet 12 preferably by adjustable clamp fingers (not shown) that fit within at least two of the tubes 16 and either expand to fill the tubes 16 or pinch the fingers between the tubes 16 to hold the support plate 122 in a fixed position on the tube sheet 12.

Each of the rail members 120 and the chassis rail members 108 preferably are identical square aluminum box extrusion rails that have spaced notches or openings 146 extending along at least one side of the rail. These notches 146 are engaged by air motor drive sprockets (not shown) to move the chassis 106 along the frame 104 in an X direction or move the chassis 106 along a chassis support member 124 in a Y direction orthogonal to the box rail member of the frame 104. The extrusions 108 and 120 are preferably square tubes in cross section with raised ribs 148 running along each exterior corner of the rail. Rollers 150 fastened to the chassis support member 124 rollably capture the ribs 148 and rollably support the chassis 106 on the frame 104 via these raised ribs 148 on the rail members 120 and 108.

Figure 3:
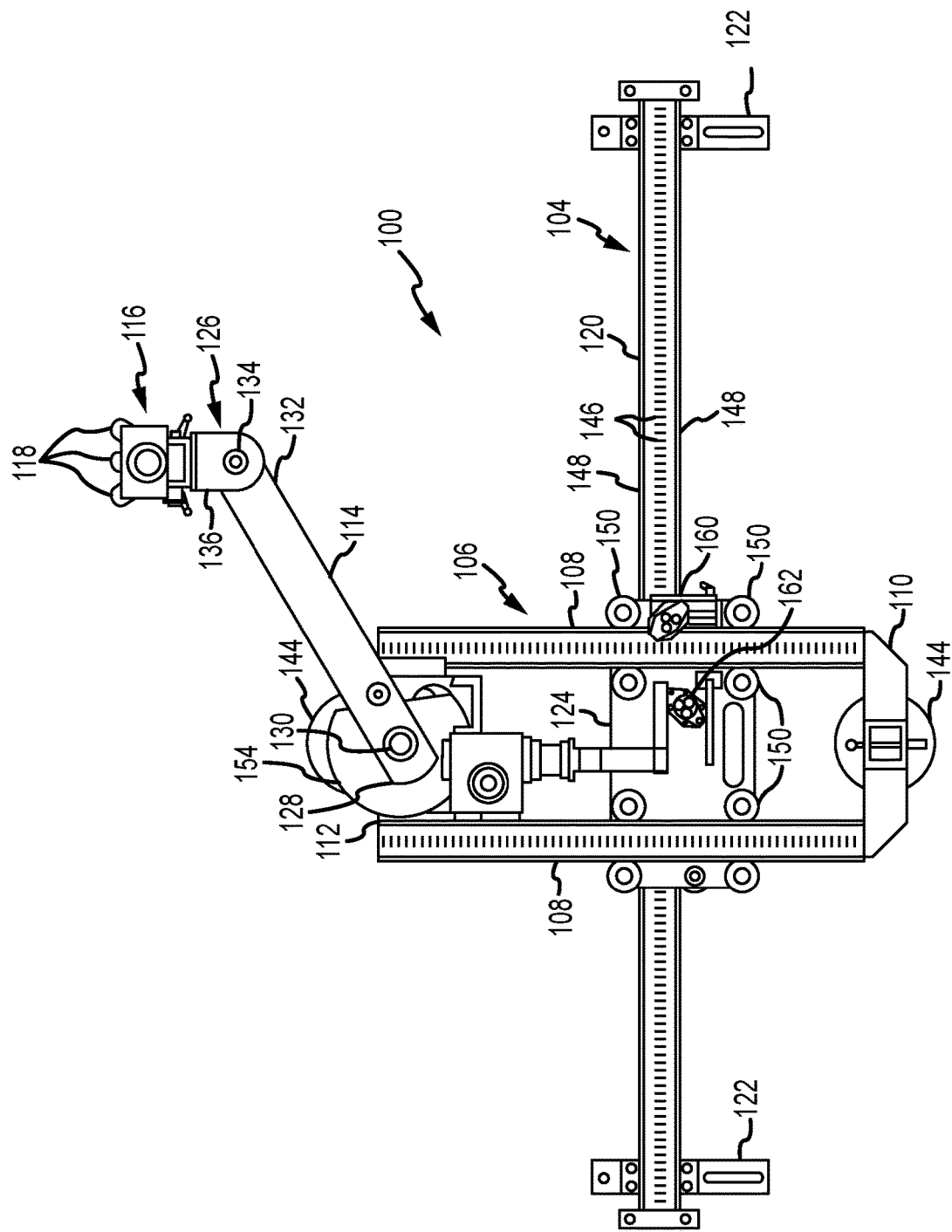
FIG. 3 is a separate plan view of the apparatus in accordance with the present disclosure shown in FIGS. 1 and 2.

A separate plan view of the apparatus 100 is shown in FIG. 3. The guide hand 116 is connected to the distal end 132 of the rotary arm 114 by a U shaped wrist bracket 126. This guide hand 116 carries at least two lance guide tubes 118 and, in the illustrated embodiment, carries three guide tubes 118 arranged in a line. The Proximal end 128 of the rotary arm 114 is rotatably fastened to a stationary axle 130 that is fixed to one of the first and second brackets 110, 112. In the embodiment shown, the stationary axle 130 is fastened in a fixed vertical orientation to second bracket 112 of the chassis 106. The rotary arm 114 is journal bearing supported on the stationary axle 130. The wrist bracket 126 is journal bearing supported at the distal end 132 of the rotary arm 114 by a wrist bracket axle 134 that is fixed to the wrist bracket 126.

Figure 4:
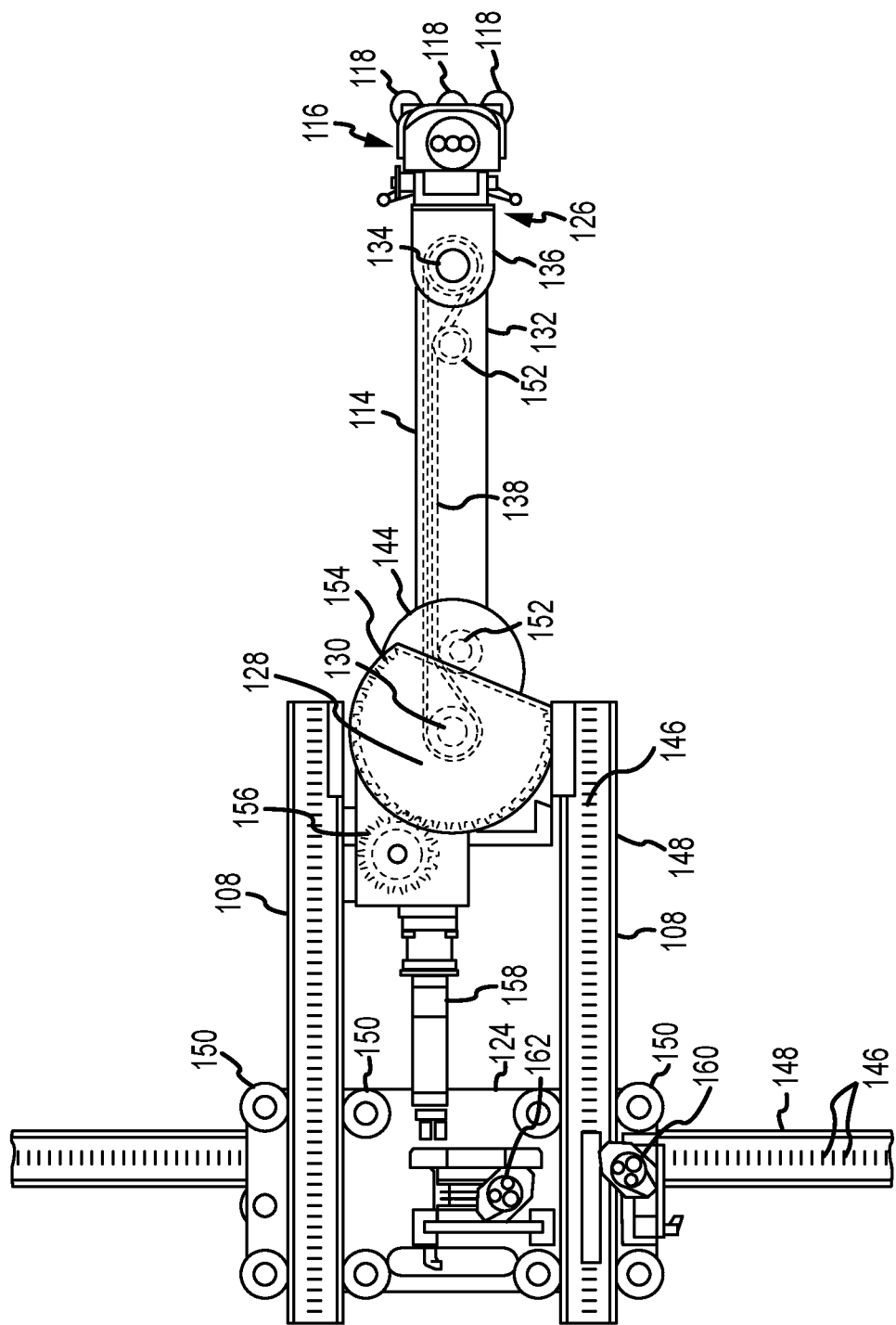
FIG. 4 is a partial enlarged plan view of the apparatus shown in FIG. 3 showing internal arm components.

The stationary axle 130 has a cog gear 140 fixed to it. Similarly, a cog gear 142 is fixed to the wrist bracket axle 134. As best seen in FIG. 4, an endless cogged belt 138 within the arm 114 passes around the cog gear 140 and around the cog gear 142 and thus around the axles 130 and 134. The rotatable arm 114 is preferably a square tube and the cogged belt 138 extends between the axles 130 and 134 within the square tube of the arm 114. A pair of adjustable idler cog wheels 152 are spaced apart and mounted within the arm 114 to maintain tension on the belt 138. The arm 114 may be a single box structure with a square cross section or may be a sandwich of two U shaped channel members fastened together. Alternatively a single U shaped channel member could also be utilized.

The proximal end 128 of the arm 114 is bolted, or otherwise fixed to a gear wheel 154 which rotates about the stationary axle 130 fastened to the bracket 112. The gear wheel 154 engages a drive gear 156 driven by an air motor 158 fastened to the chassis bracket 112. This air motor 158 thus controls the arcuate position of the gear wheel 154 and in turn the rotary arm 114 with respect to the chassis 106.

The rotary arm 114 is positioned via air motor 158 within a plane parallel to the plane of the tube sheet 12. Another air motor 160 is mounted on the chassis support member 124. This air motor 160 drives a sprocket which engages notches 146 in one of the chassis rails 108 to drive the chassis 106 in the Y direction orthogonal to the frame 104 and above the tube sheet 12. A third air motor 162 is fastened to the chassis support member 124 and drives a sprocket that engages notches 146 in the frame rail 120 to move the chassis 106 in the X direction along the frame 104. Because the frame 104 preferably only utilizes a single rail member 120, the chassis 106 has a skid foot 144 adjustably fastened to each of the brackets 110 and 112 of the chassis 106. These skid feet 144 permit the chassis 106 to slide over the tube sheet 12 while minimizing any torque applied to the rail 120 when the chassis 106 is extended in either direction from the frame 104 and maintain a fixed height of the rotary arm 114 carrying the guide tubes 118 above the tube sheet 12.

Figure 5:
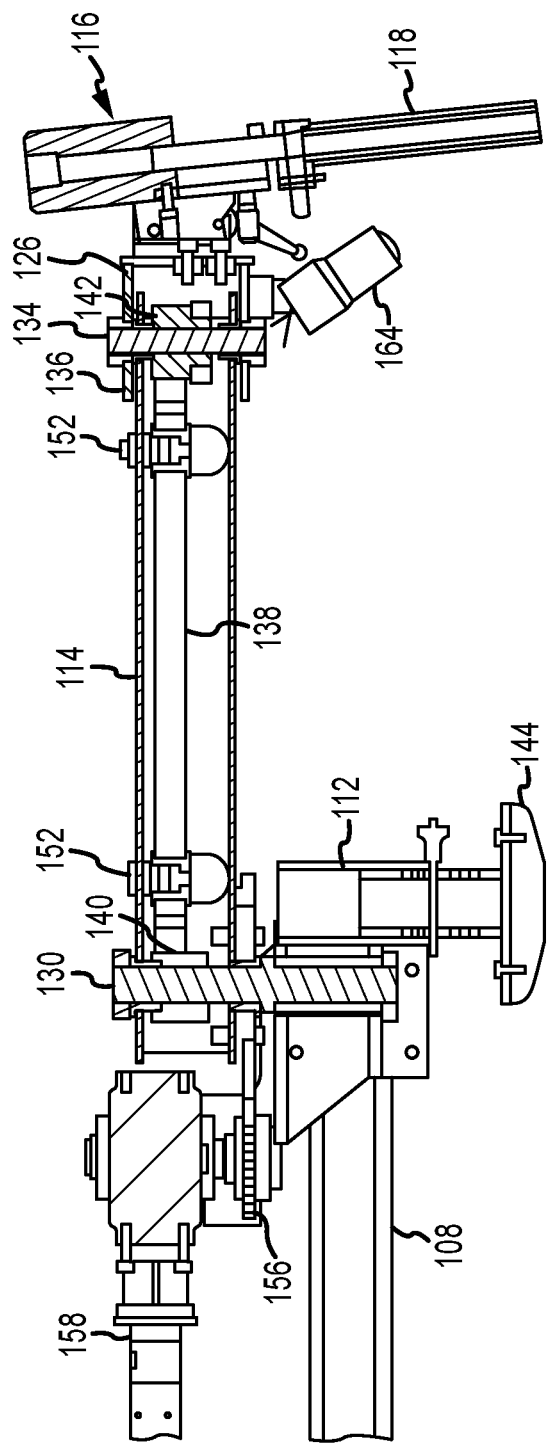
FIG. 5 is sectional side view through the apparatus taken on the line 5-5 shown in FIG. 4.

As best seen in FIG. 1, the apparatus 100 also has a camera 164 fastened to the wrist bracket 126 that is directed toward the tube sheet 12 below the guide tubes 118. This camera 164 is used to verify proper alignment of the guide tubes 118 in registry with the tubes 16 prior to cleaning lance insertion into the tubes 16. Turning now to FIG. 5, a partial sectional view of the apparatus 100 is shown. The hand 116 is canted at an angle of about 4°-8° from vertical to ensure that the upper end of the hand 116 and snout 102 (FIG. 1) clears the wall of the dome 10 when accessing the last row of tubes 16 adjacent the outer wall of the dome 10. This cant angle can be adjusted by hand via lever 166 for different heat exchanger configurations. In the illustrated embodiment, this cant angle is fixed. The guide hand 116 also may be adjusted vertically up or down to accommodate different heat exchanger configurations.

The cogged belt 138 is not driven. The belt 138 remains stationary between the axes within the rotating arm 114 regardless of the angular position of the arm 114. Since the axes 130 and 134 remain fixed to the bracket 112 and wrist bracket 126 respectively, and the rotary position of the axle 130 remains fixed relative to the frame 104, as the arm 114 rotates, the position of the hand 116 also remains fixed with relation to the axis of the frame 104, which is aligned parallel to a row of tubes 16 in the tube sheet 12. Therefore if the apparatus 100 is centrally located to one side of a tube sheet 12 about one half of the tubes 16 in a circular tube sheet 12 may be cleaned without moving the frame 104. Hence the apparatus need only be repositioned once, on the opposite half of the tube sheet 12, in order for each tube in the entire array of tubes 16 to be cleaned, and an operator may clean the entire set of tubes from outside the dome.

Many changes may be made to the device, which will become apparent to a reader of this disclosure. For example, the skid shoes may be replaced with spherical rollers or wheels. Where additional X direction support is desired, a parallel frame structure may be utilized instead of a single rail 120. In such a configuration, the skid shoes 144 may be unnecessary. Conversely, in small heat exchangers with a more confined tube sheet access area than as shown, the Y direction motorized travel function along rail 120 may not be required. In such a case, a lockable position of the chassis 106 relative to the frame 104 may be provided to maintain the chassis 106 in a fixed central location along rail 120 such that the chassis 106 simply moves back and forth across the rail 120 of the frame 104 while the arm 114 rotates to position the guide hand 116 appropriately. The camera 164 may be repositioned, a number of cameras may be utilized, and other vision, lighting and sensing devices may be utilized to allow the lance positioner apparatus 100 to auto-detect tube locations within the tube sheet 12 with the goal of remotely moving the guide hand 116 based on actual tube positions and the number of lances being used.

Referring now to FIG. 6, system 200 incorporating the apparatus 100 in accordance with the present disclosure as in FIG. 1 with a manway 202 open to permit installation and maneuvering of the apparatus 100 over the tube sheet 12 within the dome 10. This apparatus 200 includes a positioner apparatus 100, a snout 102 or 204, and a rail assembly 206 fastened to the manway 202. Mounted on the rail assembly 206 is a flexible lance drive 208. This lance drive 208 is mounted to the rail assembly 206 via a wheeled trolley 210 that rides on the rail 212 to permit the lance drive 208 to move back and forth along the rail 212 of the rail assembly 206 as the carriage 106 and arm 114 of the apparatus 100 move over the tube sheet 12 within the dome 10 to reposition one or more flexible lances in registration with appropriate tubes in the tube sheet 12.

The lance drive 208 is preferably mounted to permit forward and back movement relative to the positioning apparatus 100 because the snout 102, or the alternative snout 204 described further below, is flexible but has a fixed length. In order to position the distal end of the positioner arm 114 over any specific set of tubes in the tube sheet 12, the mounting for the lance drive 208 should also be flexible, but preferably constrained in a linear direction. Hence the sliding or rolling trolley configuration for the lance drive 208 to permit the location of the drive 208 to change with respect to the positioner 100 while restricting unnecessary movement of the lance drive 208. The lance drive 208 may be pivotally mounted on the wheeled trolley 210 so as to permit some side to side movement of the drive 208. Furthermore, this pivoting mount on the trolley 210 may optionally be fastened such that rotation of the drive 208 is restricted or eliminated. Preferably the trolley provides about a 10 degree forward tilt to the lance drive 208 so that it may be moved to a position close to the end of the rail assembly 206 adjacent the rim of the manway 202 when the positioning arm 114 is aligned with the farthest tubes in the tube sheet, and back away from the manway 202 when the positioning arm 114 is closest to the location of the manway 202.

In FIGS. 1 through 5, the snout 102 is shown as a smooth tube. This smooth tube may be a steel braided sleeve or a polymer coated or lined sleeve. An exemplary alternative embodiment 204 of the snout 102 is separately shown in FIGS. 7 and 8. In this embodiment, the snout 204 includes multiple snout segments 220 connected together in series. In this exemplary embodiment 204 the end segment 220 is fastened to a male tubular connector fitting 224. The other end of the series of connected snout segments 220 is fastened to a female tubular connector fitting 226 which is, in turn, configured to be connected to an appropriate connection on either the lance positioner apparatus 100 or the lance drive apparatus 208. The use of a female connector fitting 226 or male fitting 224 purely depends on the corresponding fitting on the end component. Hence the snout 204 may optionally utilize two male fittings 224 or two female fittings 226 instead of one of each type. Preferably these fittings are cam-lock type quick disconnect fittings 224 and 226 that can be quickly engaged or disengaged as may be needed in the particular installation application.

Figure 7:
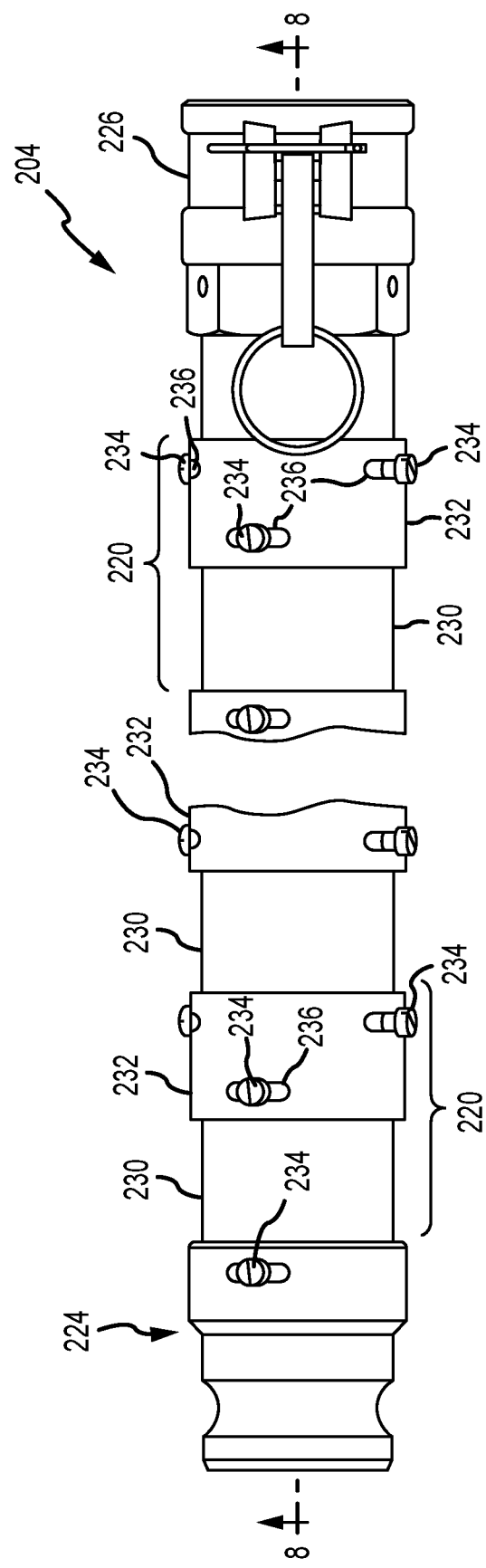
FIG. 7 is a side view of an exemplary alternative snout utilized in the system shown in FIG. 6.
Figure 8:
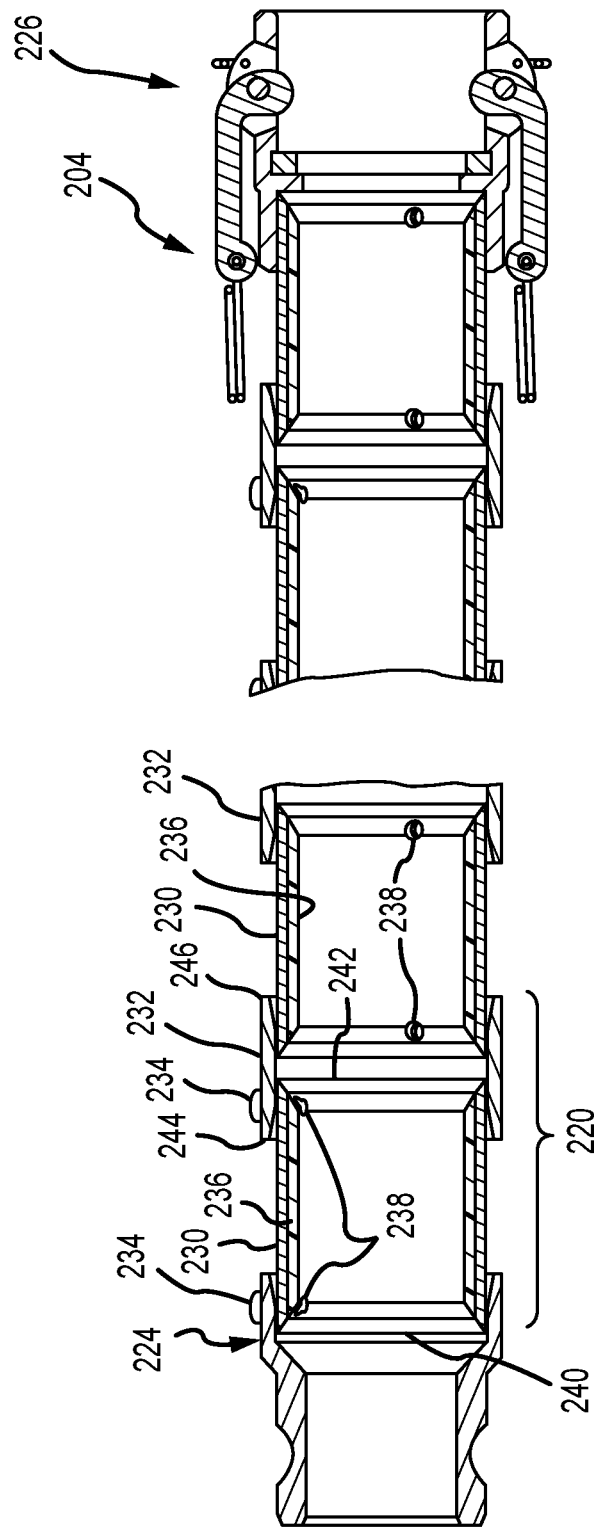
FIG. 8 is a longitudinal sectional view of the snout apparatus shown in FIG. 7.

In the exemplary embodiment 204 shown in FIGS. 7 and 8, each segment 220 comprises a tubular element 230, a collar element 232, and a plurality of shoulder bolts 234 connecting the elements together. In addition, each tubular element 230 is preferably lined with a high molecular weight plastic tube lining 236 to provide a smooth contact/guide surface for the two or three lances being carried through the snout 204. Lining 236 may be a rigid sleeve received within tubular element 230 or may be a coating applied to the inside surface of the element 230.

Each tube element 230 is about 3 inches long and has at least two and preferably four threaded bores 238 spaced equally apart around and adjacent its proximal end 240. Similarly, the distal end 242 of each tubular element 230 has at least two and preferably four threaded bores 238 spaced apart around and adjacent the distal end 242.

The collar element 232 of each segment 220 has a proximal end 244 and a distal end 246, Each end of the collar element 232 has a plurality of peripheral closed slots 248 therearound and preferably two or four equally spaced apart adjacent the end 244 or 246. These slots 248 may be arcuately offset from the slots 248 at the other end of the collar element 232. For example, if there are two slots 248 adjacent each end 244 and 246 they would preferably be diametrically opposed and arcuately offset 90 degrees as shown in FIGS. 7 and 8.

In the illustrated embodiment shown in FIGS. 7 and 8, each of the slots 248 is preferably at least about 0.50 inch long and slightly more than about 0.250 inch wide. For a 2.25 inch inside diameter tube element 230, the outer diameter would be about 2.50 inches. Each collar element 232 is preferably less than 2 inches long, about 1.7 inches, and has an ID of about 2.55 inch. In addition the inner walls adjacent the ends 244 and 246 are outwardly tapered at an angle up to about 45 degrees, and preferably between about 5 to 15 degrees, and more preferably about 10 degrees to limit the amount of deflection of each segment 220 to about 10 degrees. This is done to limit the bend radius for the flexible lances being carried through the snout 204 such that they are easily moved forward and backward through the snout 204 as may be required in the particular service application.

Each segment 220 further has at least four and preferably six shoulder bolts 234 with two fastening the segment 220 to one adjacent segment 220, two fastening the segment 220 to a next adjacent segment 220 or connector fitting 224 or 226, and two fastening the collar 232 to the tubular element 230. As is shown in FIGS. 7 and 8, each longitudinal set of shoulder bolts 234 are positioned in slots 236 that are arcuately displaced 90 degrees. In addition, the chamfering or angling of the collar 232 ends to about 10 degrees permits a maximum bend of the each segment 220 to about 20 degrees or less. This limitation of bend is necessary to ensure smooth transition of the flexible lance hoses carried within the snout 204. The diameter the shoulder bolt shoulders is preferably slightly less than 0.25 inch thus ensuring close, but loose, fit of each tube element 230 within a collar element 232 while also permitting rotation of the snout 204 adjacent segments 220 up to about 25 degrees in this exemplary embodiment. In other embodiments, each of the slots 236 may have a different length, depending on the amount of maximum bend that is desired for a particular combination of lance hoses to be carried by the snout apparatus.

The dimensions set forth above may differ for different embodiments. Also, the number of segments and arrangement may be other than as specifically described. For example, the tube 230 and the collar 232 may each have a different shape than a straight circular cylindrical tube as shown. These segment components may be flat sided, e.g. hexagonally or octagonally sided tubular components, for example.

The apparatus described herein may be utilized in other than close dome applications, such as deep channel head applications or heat exchangers for which the dome may be completely removed. While the use of a cogged endless belt 138 and cog gears 140, 142 is shown and is described above, other equivalent systems may be utilized such as a roller chain and sprocket configuration. In addition, a caliper style brake may be added to the rotary gear to eliminate effects of backlash in longer rotary arm applications with larger tube sheets. All such changes, alternatives and equivalents in accordance with the features and benefits described herein, are within the scope of the present disclosure. Such changes and alternatives may be introduced without departing from the spirit and broad scope of my invention as defined by the claims below and their equivalents.

What is claimed is:

1. An apparatus comprising:
a frame configured to be removably fastened parallel to a row of tubes in a tube sheet within a domed end of a heat exchanger device;
a chassis mounted on the frame, the chassis having a pair of spaced apart parallel rail members maintained in parallel relation by first and second brackets fastened to ends of the rail members;
a rotary arm extending from one of the brackets; and
a flexible lance guide hand fastened to a distal end of the rotary arm configured to maintain a plurality of flexible lance guide tubes in parallel alignment with the row of tubes irrespective of an angle between the rotary arm and the frame;
wherein the rotary arm is configured to rotate through an arc greater than 180 degrees and the flexible lance guide hand is configured for angular cant adjustment.

2. The apparatus according to claim 1 wherein the frame includes a box rail member having opposite ends each fastened to a support plate removably fastened to the tube sheet.

3. The apparatus according to claim 2 further comprising a chassis support member mounted on the frame for movement along the box rail member of the frame in an X direction.

4. The apparatus according to claim 3 wherein the chassis is movably mounted on the chassis support member for movement of the chassis in a Y direction orthogonal to the box rail member of the frame.

5. The apparatus according to claim 4 wherein each of the first and second brackets further comprises a skid foot adjustably fastened thereto so as to rest against the tube sheet as the chassis is moved in the Y direction.

6. The apparatus according to claim 1 wherein the guide hand is connected to the rotary arm by a U shaped wrist bracket.

7. The apparatus according to claim 6 wherein the guide hand carries at least two lance guide tubes.

8. The apparatus according to claim 6 wherein a proximal end of the rotary arm has a stationary axle fixed to one of the first and second brackets and the distal end of the rotary arm has a vertical wrist axle fixed to legs of the U shaped wrist bracket.

9. The apparatus according to claim 8 wherein the rotary arm is journal bearing supported on the stationary axle and the wrist bracket is journal bearing supported at the distal end of the rotary arm.

10. The apparatus according to claim 8 further comprising a cogged endless belt connected between a cog gear fixed to the stationary axle and a wrist axle cog gear fixed to the wrist axle.

11. An apparatus comprising:
a frame including a box rail member having opposite ends configured to be removably fastened parallel to a row of tubes in a tube sheet within a domed end of a heat exchanging device;
a chassis support member mounted on the frame for movement along the box rail member of the frame in an X direction;
a chassis having a pair of spaced apart parallel rail members maintained in parallel relation by first and second brackets fastened to ends of the parallel rail members, wherein the chassis is movably mounted on the chassis support member for movement of the chassis in a Y direction orthogonal to the box rail member of the frame;
a rotary arm extending from one of the first and second brackets; and
a flexible lance guide hand fastened to a distal end of the rotary arm configured to maintain a plurality of flexible lance guide tubes in parallel alignment with the row of tubes irrespective of an angle between the rotary arm and the frame;
wherein the rotary arm is configured to rotate through an arc greater than 180 degrees and the flexible lance guide hand is configured for angular cant adjustment.

12. The apparatus according to claim 11 wherein the guide hand is connected to the rotary arm by a U shaped wrist bracket.

13. The apparatus according to claim 12 wherein the guide hand carries at least two lance guide tubes.

14. The apparatus according to claim 12 wherein a proximal end of the rotary arm has a stationary axle fixed to one of the first and second brackets and the distal end of the rotary arm has a vertical wrist axle fixed to legs of the U shaped wrist bracket.

15. The apparatus according to claim 14 wherein the rotary arm is journal bearing supported on the stationary axle and the wrist bracket is journal bearing supported at the distal end of the rotary arm.

16. The apparatus according to claim 15 further comprising a cogged endless belt connected between a cog gear fixed to the stationary axle and a wrist axle cog gear fixed to the wrist axle.

17. The apparatus according to claim 11 wherein each of the first and second brackets further comprises a skid foot adjustably fastened thereto so as to rest against the tube sheet as the chassis is moved in the Y direction.

18. A system comprising:
a flexible lance positioning apparatus comprising:
a frame including a box rail member having opposite ends configured to be removably fastened parallel to a row of tubes in a tube sheet within a domed end of a heat exchanging device;
a chassis support member mounted on the frame for movement along the box rail member of the frame in an X direction;
a chassis having a pair of spaced apart parallel box rail members maintained in parallel relation by first and second brackets fastened between ends of the parallel rail members, wherein the chassis is movably mounted on the chassis support member for movement of the chassis in a Y direction orthogonal to the box rail member of the frame;
a gear driven rotary arm extending from one of the first and second brackets;
a flexible lance guide hand fastened to a distal end of the gear driven rotary arm configured to maintain a plurality of flexible lance guide tubes in parallel alignment with the row of tubes irrespective of an angle between the near driven rotary arm and the frame;
a lance drive; and
a snout connecting the lance drive to the positioning apparatus, the snout comprising:
one of a male tubular connector and a female tubular connector fitting configured to fasten to a flexible lance drive apparatus;
another one of a male and a female tubular connector fitting configured to fasten to a flexible lance positioner apparatus; and
a plurality of snout segments connected together in series so as to connect in series between the one and another connector fittings, wherein each snout segment comprises a cylindrical tube portion sized to receive and pass therethrough a plurality of flexible lances, and a tubular collar portion connected to the tube portion, wherein the collar portion is larger in diameter than the tube portion and has a plurality of peripheral arcuate closed slots adjacent to and spaced around a distal end of the collar portion, and a plurality of shoulder bolts each fastened to a next segment tube portion and extending through one of the closed slots;
wherein the gear driven rotary arm is configured to rotate through an arc greater than 180 degrees and the flexible lance guide hand is configured for angular cant adjustment.

19. The apparatus according to claim 18 further comprising a first air motor mounted to the chassis support member for moving the chassis along the frame member in the X direction.

20. The apparatus according to claim 19 further comprising a trolley fastening the lance drive to a rail operable to permit the lance drive to move along the rail in response to movement of the gear driven rotary arm.

* * * * *